United States Patent [19]

Morgan, III et al.

[11] Patent Number: 6,110,832
[45] Date of Patent: Aug. 29, 2000

[54] METHOD AND APPARATUS FOR SLURRY POLISHING

[75] Inventors: Clifford O. Morgan, III, Burlington; Matthew J. Rutten, Milton; Erick G. Walton, Underhill; Terrance M. Wright, Esses, all of Vt.

[73] Assignee: International Business Machines Corporation, Armonk, N.Y.

[21] Appl. No.: 09/301,050

[22] Filed: Apr. 28, 1999

[51] Int. Cl.[7] .................................................. H01L 21/00
[52] U.S. Cl. ......................... 438/692; 156/345; 216/88; 216/89; 438/693; 438/745
[58] Field of Search .................... 438/692, 693, 438/745, 747; 216/38, 88, 89; 156/345 LP; 252/79.1

[56] References Cited

U.S. PATENT DOCUMENTS 4,323,422   4/1982   Calawa et al. .................. 438/747 X
5,216,843   6/1993   Breivogel et al. .
5,478,435  12/1995   Murphy et al. ................... 216/89 X
5,658,185   8/1997   Morgan et al. .
5,896,870   4/1999   Huynh et al. .................... 438/693 X

FOREIGN PATENT DOCUMENTS 0 777 266 A1   6/1997   European Pat. Off. .
7-221067       8/1995   Japan .

OTHER PUBLICATIONS

J. M. Steigerwald, et al, "Chemical Mechanical Planarization of Microelectronic Materials," Section 3.2, pp 40–41.

*Primary Examiner*—William Powell
*Attorney, Agent, or Firm*—Richard A. Henkler

[57] ABSTRACT

A method and apparatus for Chemical-Mechanical Polishing of semiconductor wafers using various formulations of high viscosity slurry.

18 Claims, 3 Drawing Sheets

METHOD AND APPARATUS FOR SLURRY POLISHING

BACKGROUND

1. Technical Field of the Present Invention

The present invention generally relates to a polishing apparatus and a method for performing a polishing operation. More specifically, the present invention is an improved method and apparatus for performing polishing using a high viscosity slurry.

2. Background of the Present Invention

In the manufacture of integrated circuits, wafer surface planarity is of extreme importance. Photolithographic processes are typically pushed close to the limit of resolution in order to create maximum circuit density. For a 16 mb dynamic random access memory, minimum critical dimensions, such as wordline and bitline width will initially be in the $0.5\mu$–$0.7\mu$ range. Since these geometries are photolithographically produced, it is essential that the wafer surface be highly planar so that the electromagnetic radiation used to create a masking layer may be accurately focused at a single level thus resulting in precise imaging over the entire surface of the wafer. If the wafer surface was sufficiently non-planar, the resulting structures would be poorly defined, with the circuit being either non-functional or, at best, endowed with less than optimum performance.

In order to achieve the degree of planarity required to produce ultra high density integrated circuits, Chemical-Mechanical Polishing (CMP) or planarization processes are employed. In general, CMP processes involve holding a semiconductor wafer against a moving polishing surface that is wetted with a chemically reactive/abrasive slurry. Slurries are usually either basic or acidic, and generally contain alumina or silica particles. The polishing surface is typically a planar pad made of relatively soft, porous material such as blown polyurethane. The pad is usually mounted on a planar platten.

Reference now being made to FIG. 1, a diagram is shown illustrating a conventional rotational CMP apparatus 10. The apparatus 10 includes a wafer carrier 11 for holding a semiconductor water 12. A soft, resilient pad 13 is typically placed between the wafer carrier 11 and the wafer 12, and the wafer 12 is generally held against the resilient pad 13 by a partial vacumn, friction, or adhesive, etc. Frictional affixation can be accomplished by placing a resilient backing pad of uniform thickness between the carrier 11 and the wafer 12, the backing pad having a higher co-efficient of friction with respect to the wafer 12 and carrier 11 surface with which it is in contact on opposite sides than the co-efficient of a friction of the wafer 12 with respect to the slurry saturated polishing pad 13. The wafer carrier 11 is designed to be continuously rotated by a drive motor 14. In addition, the wafer carrier 11 is also designed for transverse movement as indicated by the double headed arrow 15. The rotational and transverse movement is intended to reduce variability and material removal rates over the surface of the wafer 12.

The apparatus 10 also includes a rotating platten 16 on which is mounted a polishing pad 17. The platten 16 is relatively large in comparison to the wafer 12 so that during the CMP process, the water can be moved across the surface of the polishing pad 17 by the wafer carrier 11. A low viscosity polishing slurry containing chemically-reactive solution, in which are suspended abrasive particles, is deposited through a supply tube 18 on to the surface of polishing pad 17. The principals of such a conventional CMP apparatus 10 are explained in greater detail in connection with FIG. 2.

Reference now being made to FIG. 2, a diagram is shown illustrating the principles of the conventional rotational CMP process used by the apparatus 10 of FIG. 1. The polishing pad 17 is rotated at an angular velocity of $W_p$ radiance per second (RADS./sec.) about axis 0. The water to be planarized 12 is rotated at an angular velocity of $W_W$ RADS./sec., typically in the same rational sense or rotational sense as the pad. It is easily understood that the linear speed (L) of the polishing pad in centimeters/sec., at any given radius (R) in centimeters from axis will be equal to $W_p r$. Experience has demonstrated that the rate of removal of material from the wafer surface is related to the speed with which the pad surface makes contact with the wafer surface.

There are a number of disadvantages associated with the conventional CMP process. For example, existing CMP systems employ gravity or other means for forcing the wafer against the polishing surface of the pad with an object that a certain amount of slurry remain disposed between the two structures. In current CMP processes, there is no mechanism for addressing the quantity or quality of slurry disposed between the wafer and the polishing pad. Rather, the hope is that a certain portion of the slurry pumped onto the polishing pad will make it between the wafer and the pad. As a direct result, a large portion of the slurry used during the CMP processions fails to reach the wafer (i.e. it is wasted). Further, the used slurry must have some sort of waste treatment process (e.g. acid/base neutralization, metals removal, organic BOD reductions, etc.), before it can be disposed or recycled. Other disadvantages of a low viscosity slurry include: undesirable scratchinig of the wafer and lower polishing rates at a high down force.

It would, therefore, be a distinct advantage to have a method and apparatus for CMP processing that would use lower amounts of slurries, and eliminate many of the undesirable characteristics of low viscosity slurries. The present invention provides such a method and apparatus.

BRIEF DESCRIPTION OF THE DRAWINGS

The present invention will be better understood and its numerous objects and advantages will be come more apparent to those skilled in the art by reference to the following drawings, in conjunction with the accompanying specification, in which.

SUMMARY OF THE PRESENT INVENTION

The present invention is a method and apparatus for conducting Chemical-Mechanical Polishing of semiconductor wafers using various formulations of high viscosity slurry.

DETAILED DESCRIPTION OF THE PREFERRED EMBODIMENT OF THE PRESENT INVENTION

The present invention teaches a novel and useful method and apparatus for making and using a high viscosity slurry for CMP processing as explained in connection with FIG. 3.

Figure 1:
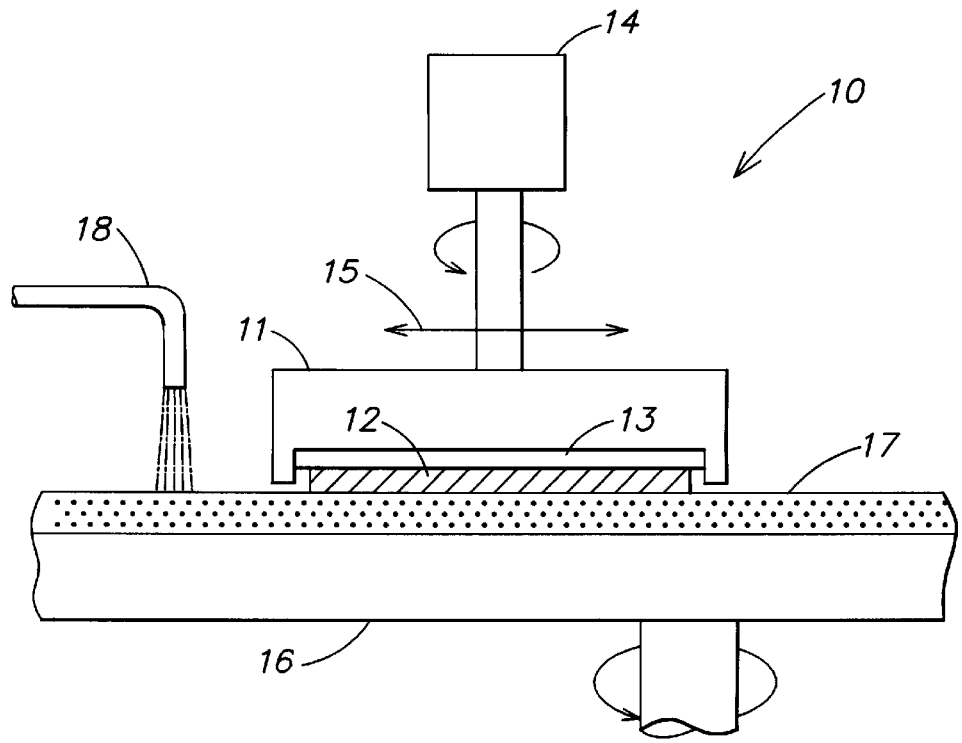
FIG. 1 is a diagram illustrating a conventional rotational Chemical-Mechanical Polishing (CMP) apparatus.
Figure 2:
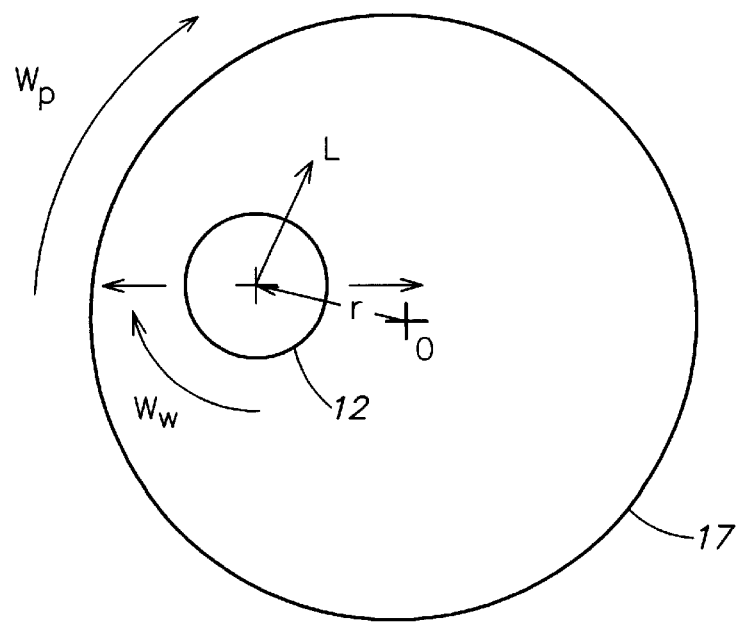
FIG. 2 is a diagram illustrating the principals of the conventional rotational CMP process used by the apparatus of FIG. 1.
Figure 3:
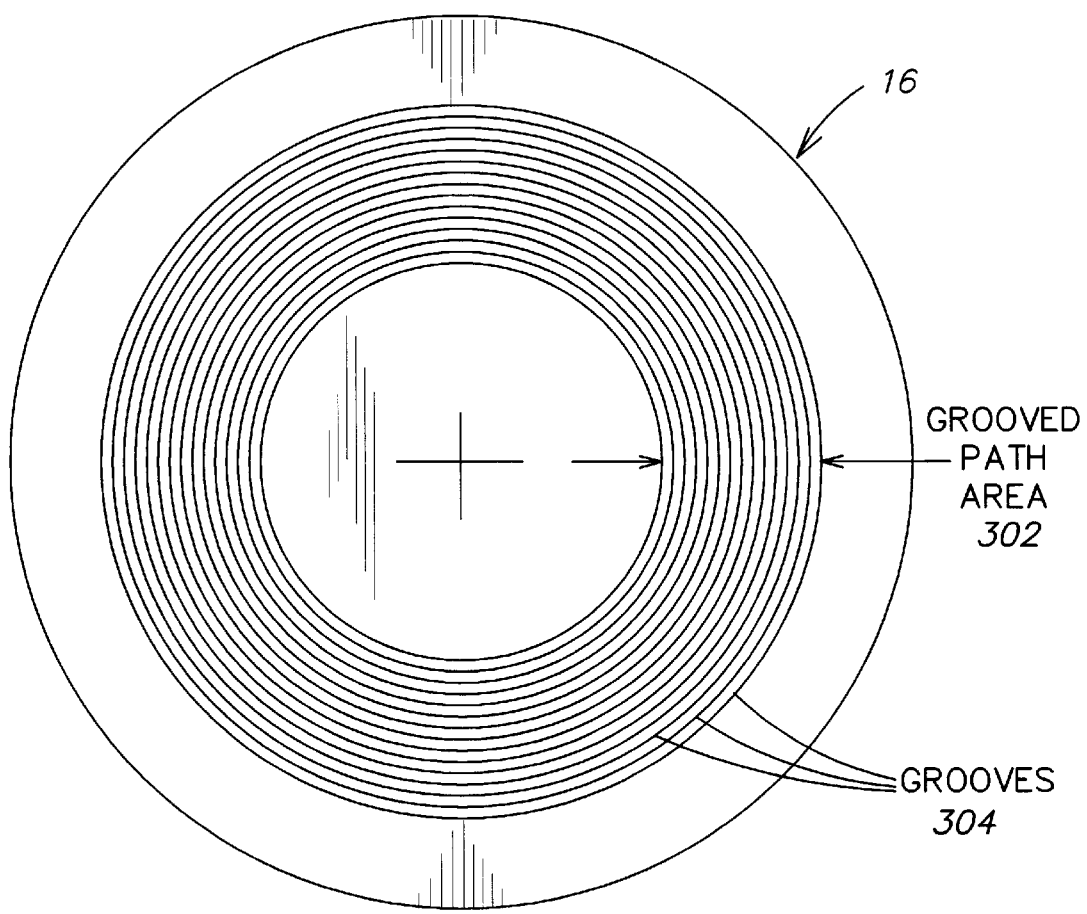
FIG. 3 is a diagram illustrating in greater detail the polishing pad of FIG. 1 as modified according to the teachings of the preferred embodiment of the present invention.

Reference now being made to FIG. 3, a diagram is shown illustrating in greater detail the polishing pad 16 as modified according to the teachings of the preferred embodiment of the present invention. As illustrated, the polishing pad 12 has been modified to include a series of substantially circumferential grooves 304 formed across the portion of the pad 16 over which polishing takes place. The macro grooves 304 aid in polishing by channeling slurry between the substrate surface and the pad 16. The macro grooves 304 are formed prior to polishing by means of a milling machine a lathe, a press or other similar method. Since polishing does not normally occur across the entire pad surface, the grooves 304 are usually only formed into a portion of the pad over which polishing takes place as indicated by the grooved path area 302. Specific detail concerning the shape and function of the macro grooves 304 is discussed in connection with FIG. 4.

Figure 4:
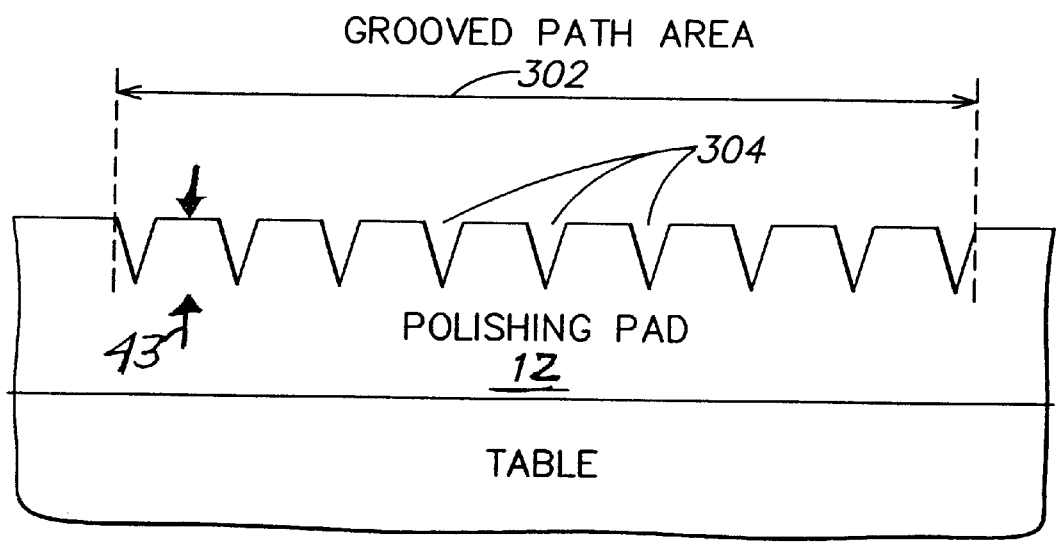
FIG. 4 is a cross-sectional diagram illustrating in greater detail the grooved pad of FIG. 3 according to the teachings of the preferred embodiment of the present invention.

Reference now being made to FIG. 4, a cross-section of the grooved pad area 302 of FIG. 3 is shown in greater detail according to the teachings of the preferred embodiment of the present invention. As illustrated the grooves 304 are characteristically triangular shaped, and have an initial depth which is sufficient to allow slurry to channel beneath the substrate surface during polishing. One skilled in the art, would readily understand that various other types of grooves could also be used (e.g. square). Ideally, the depth of the macro grooves 304 is approximately 300$\mu$. The spacing of the grooves varies from about 2 grooves per radial inch to 32 grooves per radial inch.

In general, the preferred embodiment of the present invention uses the macro grooves as illustrated in FIG. 3 in combination with a high viscosity slurry for obtaining several benefits, such as, reduced scratching, reduced waste treatment costs, laster polishing rates at a high down force, larger operating regimes for polishing parameters, enhanced slurry compositions, interactive effects, and alternative polisher designs. Each of the above noted benefits including their preferred embodiments are described in greater detail below in connection with various preferred formulations of high viscosity slurry.

High Viscosity Formulations

It first should be realized that almost any thickening agent could function as a support, or carrier, for a dispersed abrasive agent in the CMP; provided a suitable means could be found for removing or cleaning the substrate after polishing. The quantitative measure of viscosity is "$\eta$", the co-efficient of viscosity (units of mPa-sec). A short list of commonly known materials with their co-efficient of viscosity are illustrated in table 1.

TABLE I

| Fluid | Temp (Deg C.) | $\eta$, mPa-sec |
|---|---|---|
| Water | 0 | 1.8 |
|  | 20 | 1.0 |
|  | 60 | 0.65 |
| Blood | 37 | 4.0 |
| Engine Oil (SAE 10) | 30 | 200 |
| Glycerin | 0 | 10,000 |
|  | 20 | 1,410 |
|  | 60 | 81 |
| Air | 20 | 0.018 |

For applications such as the present invention, it is important to find a carrier, or thickening agent, capable of supporting an abrasive and having its "$\eta$" at least 50% higher than the viscosity of water at 20° C. In light of the above, there is some benefit to using water itself, or an aqueous based carrier, if the temperature of the system were controlled to approximately the freezing point of pure water (0° C.), or if one added a suitable thickening agent capable of increasing $\eta$ to about 1.5–2.0. However, even greater viscosities are more advantageous.

The present invention has formulated several different types of High Viscosity Slurry (HVS). Specifically, one formulation of HVS has a $\eta$ that is greater than 200, and more specifically, lies within the range of 500–1500. In yet another preferred consistency, the $\eta$ is between 2,000 and 10,000 or more.

One skilled in the art, would clearly understand that the choice of viscosity range depends upon the intended application. In example, for larger abrasive sizes, one might select a higher viscosity system to control scratching. However, it is important to remember that the main purpose of the thickening agent, or carrier, is simply to "support" the abrasive agent, and control the contact angle with the substrate surface being polished, and secondly to contain or restrict the flow of the overall slurry system itself.

In one preferred embodiment of the present invention, an aqueous based high viscosity slurry comprises water, an abrasive agent, and a thickening agent. In example, the formula could be composed preferably as 25% glycerin, 45% calcium pyrophosphate, 25% water, and 5% tin pyrophosphate. Obviously, the tin pyrophosphate can be blended with and/or substituted with other types of ingredients having similar properties.

In yet another example of an aqueous type HVS, a further preferred composition is sodium metaphosphate 42%, dicalciumphosphate "5%," trihydroxyaluminum monohydrate 1%, glycerin 13%, 70% sorbitol 19%, water 14%, sodium alginate 2%, and titaniumdioxide 4%.

The above noted aqueous HVS formulations each have a mild abrasive component. It should noted, however, that in certain applications it can be desirable to add other abrasive chemicals for greater polishing or grinding rates. In such a case, an abrasive powder is preferable such as silicon carbide (grit sizes from 120 to 1000), aluminum oxide (grit sizes from 240 to 600), aluminum oxide (particulate sizes from 3 to 25$\mu$), magnesium oxide (1$\mu$), iron oxide (3 and 3.5$\mu$), and chromium oxide (1–5$\mu$).

In yet another preferred embodiment, the aqueous high viscosity slurry includes water 12%, ammonium bifloride 15%, oxalic acid 8%, ammonium sulfate 10%, glycerin 40%, and barium sulfate 15%.

Another preferred embodiment for an aqueous HVS includes water 49%, alcohol 49%, Carbopol resin 1%, and Triethylamine 1%.

Benefits

In using any of the above defined HVS compositions there are several benefits achieved. First, reduced scratching of the wafer. The scratch reduction occurs since the hydrodynamic layer between the polishing pad and the wafer surface is thicker than that with a conventional slurry at a comparable down force. Further, the thicker hydrodynamic interfacial layer is able to accommodate larger particles or a greater portion of the particle size distribution before reaching the threshold wherein particle diameter exceeds the thickness of the interfacial layer, and scratching begins to accelerate infrequency. In addition, the HVS material is able to absorb more of the energy of scratch inducing particles than would be possible with a low viscosity material.

For instance, consider two systems representing a CMP. Each of the systems includes a polishing surface (e.g. wailer), and a polishing pad upon which the polishing action takes place. Interposed between these two surfaces is a polishing medium containing an abrasive material. In a first one of the systems, the polishing medium is a low viscosity material (in the same range as water). The second system contains one of the above defined high viscosity slurries. Assume for the moment that a foreign object/contaminant (e.g. coarse particles of sand) is introduced into both of the systems. The low viscosity slurry fails to support the foreign body particles. As a result, the response to increased wafer down force will be a decrease in hydrodynamic layer thickness and an increase in contact between the foreign body particles and polishing surface. Hence, scratching will be induced in the first system.

In contrast, using the same down force levels as the first system, the foreign body particles will be embedded (cushioned) in the higher viscosity slurry of the second system, and a greater portion of the foreign body particles' energy will be transferred to the medium, as opposed to the polishing surface, resulting in a reduced level immediately scratching at a constant down force.

Another benefit of the above noted HVS compositions is that there is a roughly, 50–75% volume reduction in the waste stream in comparison to a low viscosity slurry. This results from the fact that low viscosity slurry is flung off the platten before being consumed in actual polishing uses compared to HVS, since the adhesive forces of a paste exceed those centrifugal forces responsible for loss of conventional slurries in typical rotary polishing applications.

A further advantage of using the above noted HVS compositions are faster polishing rates at high down force. A well known result in CMP is the parabolic response of polishing rate versus applied down force. Initially, polishing rates increase with increasing down force, principally as a result of increased mechanical sheer action at the wafer surface. However this increase slowly tapers off and an actual reduction in polish rate occurs at even greater applied down force. This effect is attributable to a loss of chemical action at the wafer surface necessary to prepare the surface for mechanical abrasion. The mechanism for CMP of oxide surfaces, for example includes base catalyzed hydration of the SiO2 surface converting SiO bonds to SiOH, by strong bases, such as KOH, followed by a mechanical abrasion of the hydrated surface. The reduction in chemical action occurs because of a thinner hydrodynamic layer and insufficient reactant volume at the wafer surface to keep the surface hydrated at increased down force levels.

Another advantage of the HVS compositions illustrated above are the abilities for larger operating regimes for polishing wafers. Specifically the increased viscosity (i.e. a principal feature of HVS is its relatively stronger adhesion to the polishing pad) of HVS allows a wider practical range of operating condition; these conditions can include high platten rotation speed high down force, alternate spatial platten orientation, and higher process temperature.

In one preferred embodiment of the present invention, one of the above noted HVS compositions are spread to fill in the macro grooves 304 of FIG. 3, much like grout or spackling with any excess being scrapped off. Thereafter, a small trickle of water, with a flow rate determined by DOE (what is DOE?) would provide lubrication for the polish and transport used slurry off the pad 16. The HVS slurry will run out as the polish is completed dramatically slowing the polish rate and preventing over polish. Any remaining HVS slurry is then rinsed off between water polishing.

Furthermore, in yet another embodiment, any of the above noted HVS compositions could be dispensed through holes in the platten and/or pad. The proposed dispensing processes are well known, and are for example, illustrated in European Patent 0593057A1, which is hereby incorporated by reference herein.

It is thus believed that the operation and construction of the present invention will be apparent from the foregoing description. While the method and system shown and described has been characterized as being preferred it will be readily apparent that various changes and/or modifications could be made wherein without departing from the spirit and scope of the present invention as defined in the following claims.

What is claimed:

1. A method of Chemical Mechanical Polishing of a wafer, the method comprising of the steps of:

dispensing a high viscosity slurry onto a rotating polishing pad; and pressing the wafer onto the slurry coated polishing pad.

2. The method of claim 1 wherein the high viscosity slurry is aqueous based.

3. The method of claim 2 wherein the high viscosity slurry has a coefficient of viscosity that is it least 50 percent higher than the coefficient of viscosity of water at 20 degrees Celsius.

4. The method of claim 2 wherein the high viscosity slurry has a coefficient of viscosity between 500 and 1500.

5. The method of claim 2 wherein the high viscosity slurry has a coefficient of viscosity that is greater than 2000.

6. The method of claim 3 wherein the high viscosity slurry comprises glycerin, calcium, pyrophosphate, water, and tin pyrophosphate.

7. The method of claim 3 wherein the high viscosity slurry comprises sodium metaphosphate, dicalciumphosphate, trihydroxyaluminum monohydrate, glycerin, sorbitol, water, sodium alginate, and titanumdioxide.

8. The method of claim 3 wherein the high viscosity slurry comprises water, ammonium bifloride, oxalic acid, ammonium sulfate, glycerin, and barium sulfate.

9. The method of claim 3 wherein the high viscosity slurry comprises water, alcohol, carbopol resin, and triethylamine.

10. The method of claim 2 wherein the polishing pad includes grooves for facilitating the dispensement of the high viscosity slurry.

11. An apparatus for Chemical Mechanical Polishing of a wafer, the apparatus comprising:

means for dispensing a high viscosity slurry onto a rotating polishing pad; and means for pressing the wafer onto the slurry coated polishing pad.

12. The apparatus of claim 11 wherein the high viscosity slurry is aqueous based.

13. The apparatus of claim 12 wherein the high viscosity slurry has a coefficient of viscosity that is at least 50 percent higher than the coefficient of viscosity of water at 20 degrees Celsius.

14. The apparatus of claim 13 wherein the high viscosity slurry has a coefficient of viscosity between 500 and 1500.

15. The apparatus of claim 14 wherein the high viscosity slurry has a coefficient of viscosity that is greater than 2000.

16. The apparatus of claim 13 wherein the high viscosity slurry comprises glycerin calcium pyrophosphate, water, and tin pyrophosphate.

17. The apparatus of claim 13 wherein the high viscosity slurry comprises sodium metaphosphate, dicalciumphosphate, trihydroxyaluminum monohydrate, glycerin, sorbitol, water, sodium alginate, and titanuindioxide.

18. The apparatus of claim 13 wherein the high viscosity slurry comprises water, ammonium bifloride, oxalic acid, ammonium sulfate, glycerin, and barium sulfate.

* * * * *